United States Patent
Droux et al.

(10) Patent No.: US 7,593,404 B1
(45) Date of Patent: *Sep. 22, 2009

(54) DYNAMIC HARDWARE CLASSIFICATION ENGINE UPDATING FOR A NETWORK INTERFACE

(75) Inventors: Nicolas G. Droux, San Jose, CA (US); Sunay Tripathi, San Jose, CA (US); Yuzo Watanabe, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 553 days.

This patent is subject to a terminal disclaimer.

(21) Appl. No.: 11/112,934

(22) Filed: Apr. 22, 2005

(51) Int. Cl.
*H04L 12/28* (2006.01)

(52) U.S. Cl. .................. 370/392; 370/412; 370/432

(58) Field of Classification Search ............. 370/463, 370/412, 252
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 * | 2/2005 | Narad et al. | 709/236 |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 * | 8/2007 | Mehrvar et al. | 370/412 |
| 7,313,142 B2 | 12/2007 | Matsuo et al. | |
| 2003/0037154 A1 | 2/2003 | Poggio et al. | |
| 2005/0135243 A1 | 6/2005 | Lee et al. | |
| 2005/0138620 A1 | 6/2005 | Lewites | |
| 2006/0041667 A1 | 2/2006 | Ahn et al. | |
| 2006/0070066 A1 | 3/2006 | Grobman | |
| 2006/0174324 A1 | 8/2006 | Zur et al. | |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages)

* cited by examiner

*Primary Examiner*—Seema S Rao
*Assistant Examiner*—Henry Baron
(74) *Attorney, Agent, or Firm*—Osha • Liang LLP (57) ABSTRACT

Incoming network data is processed according to a current hardware classification "engine" configuration. As data is propagated from a network interface to a host system, an activity of one or more components of the host system is monitored. If it is determined that a desired/optimal resource utilization of the host system and/or a desired/optimal network performance is not being achieved, the hardware classification "engine" configuration is dynamically modified.

7 Claims, 6 Drawing Sheets

DYNAMIC HARDWARE CLASSIFICATION ENGINE UPDATING FOR A NETWORK INTERFACE

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" (U.S. Pat. No. 7,471,689; "Method and Apparatus for Consolidating Available Computing Resources on Different Computing Devices" (U.S. patent application Ser. No. 11/112,368; "Assigning Higher Priority to Transactions Based on Subscription Level" (U.S. patent application Ser. No. 11/112,947; "Method and Apparatus for Dynamically Isolating Affected Services Under Denial of Service Attack" (U.S. patent application Ser. No. 11/112,158; "Method and Apparatus for Improving User Experience for Legitimate Traffic of a Service Impacted by Denial of Service Attack" (U.S. patent application Ser. No. 11/112,629; "Method and Apparatus for Limiting Denial of Service Attack by Limiting Traffic for Hosts" (U.S. patent application Ser. No. 11/112, 328; "Hardware-Based Network Interface Per-Ring Resource Accounting" (U.S. patent application Ser. No. 11/112,222; "Network Interface Card Resource Mapping to Virtual Network Interface Cards" (U.S. patent application Ser. No. 11/112,063; "Network Interface Decryption and Classification Technique" (U.S. patent application Ser. No. 11/112,436; "Method and Apparatus for Enforcing Resource Utilization of a Container" (U.S. patent application Ser. No. 11/112,910; "Method and Apparatus for Enforcing Packet Destination Specific Priority Using Threads" (U.S. Pat. No. 7,499,457; "Method and Apparatus for Processing Network Traffic Associated with Specific Protocols" (U.S. patent application Ser. No. 11/112,228; and "Method and Apparatus for Enforcing Bandwidth Utilization of a Virtual Serialization Queue" (U.S. Pat. No. 7,499,463).

BACKGROUND OF INVENTION

Figure 1:
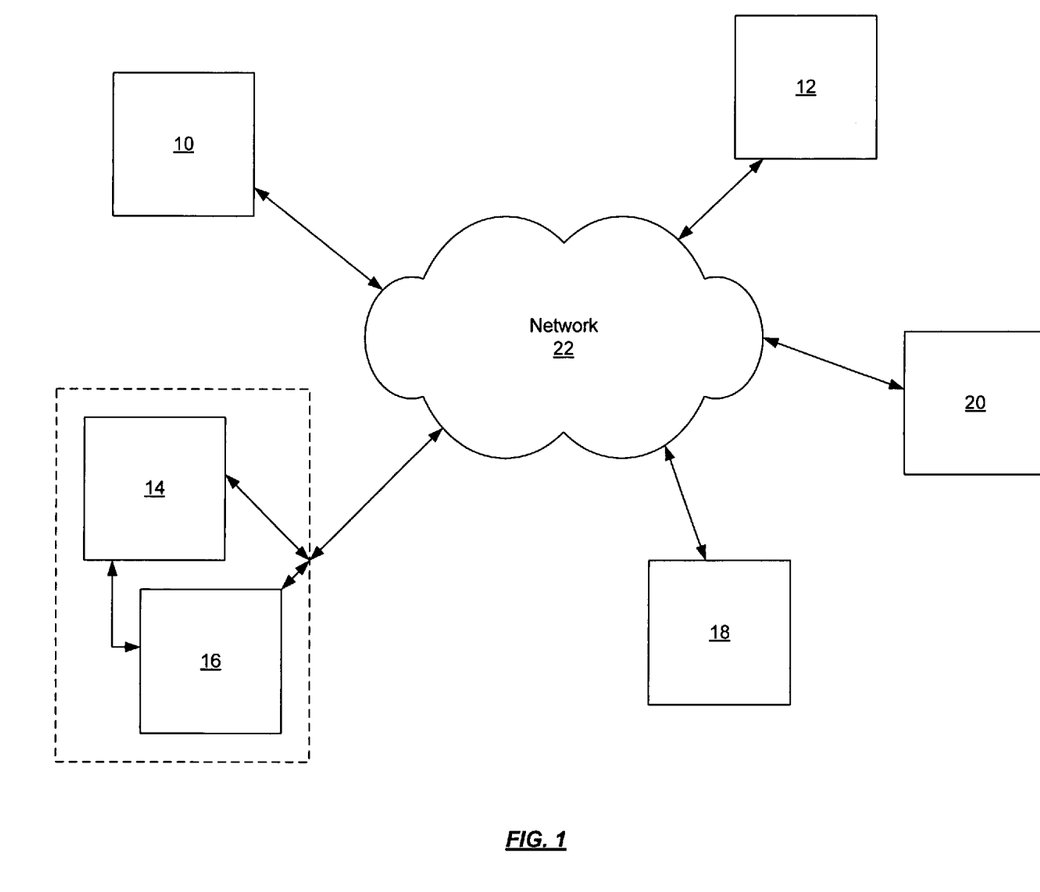
FIG. 1 shows a typical networked computing environment.

In modern computing environments, computer systems are often required to communicate with other computer systems to perform any one or more of a vast number of different functions. Such communication may involve one computer system requiring the services or resources of another computer system. Referring to FIG. 1, in cases where multiple computer systems are not or cannot be directly and physically connected to one another due to, for example, being in different or remote locations, communication among multiple computer systems 10, 12, 14, 16, 18, 20 is facilitated by one or more networks 22 (e.g., the Internet) to which the multiple computer systems 10, 12, 14, 16, 18, 20 are operatively connected.

When a computer system sends data to a network for subsequent transmission to another computer system, that data is typically sent as numerous packets of data that can be universally recognized and handled by at least those networks that play a role in facilitating the transfer of that data between the computer systems (the propagation of packets in one or more networks hereinafter referred to generally as "network traffic"). A packet is typically formed of a header portion and a payload portion. The header portion may include information regarding, for example, an address of the sending system, an address of the desired receiving system, a size of the packet, a transport protocol used to transmit the packet, or other information identifying or characterizing the packet. The payload portion includes the actual data (e.g., data needed by the receiving system to perform a particular computation) to be transmitted from the sending system over the network to the receiving system.

Figure 2:
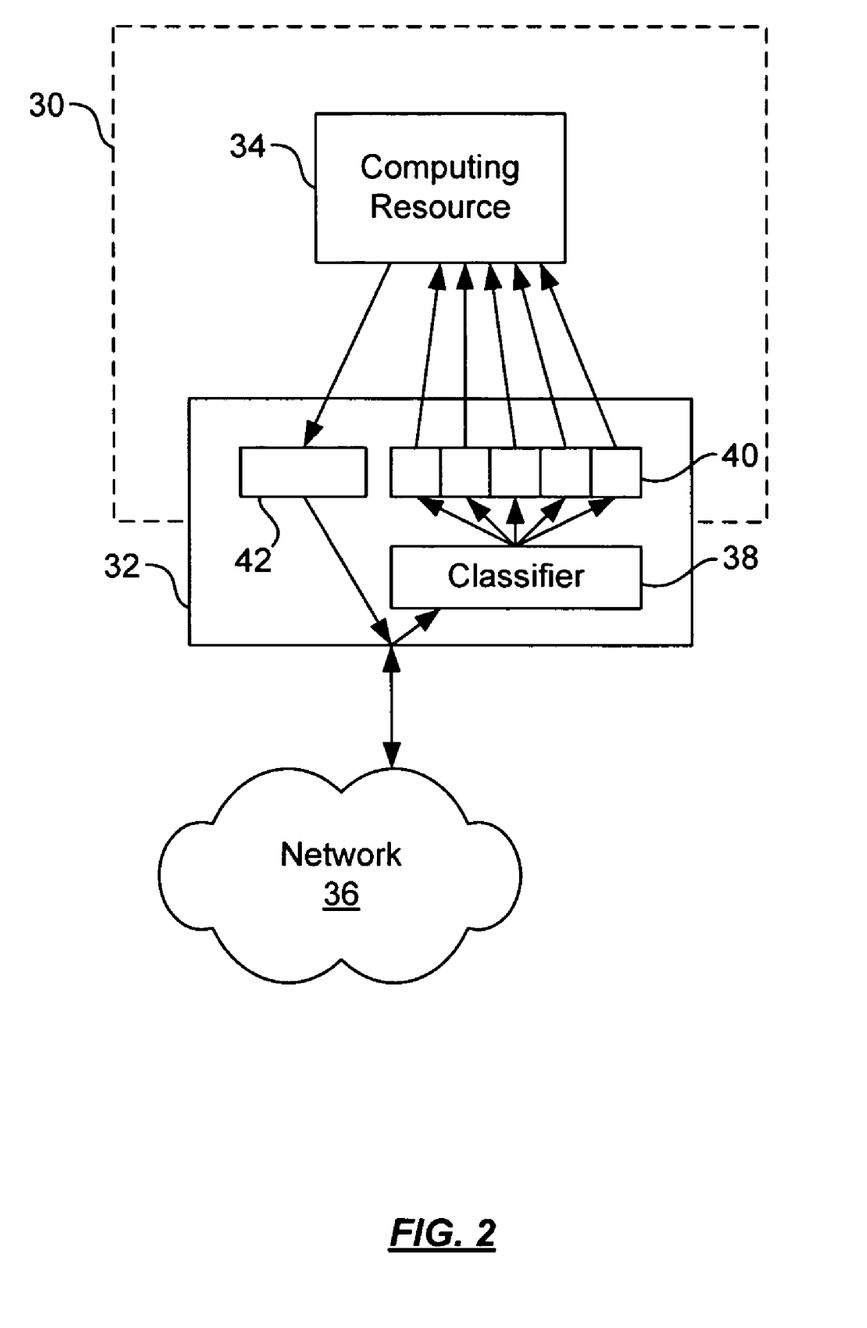
FIG. 2 shows a portion of a typical networked computing environment.

To facilitate the sending and receiving of network traffic, a computer system typically includes or is otherwise connected to a network interface such as, for example, a hardware component known as a "network interface card" (NIC). FIG. 2 shows a typical computing environment having a "host" system 30 in operative connection with a network interface card 32. As shown in FIG. 2, the host system 30 includes a computing resource (e.g., a central processing unit (CPU), a temporary data structure) 34 that is operatively connected to the network interface card 32.

The network interface card 32, which is connected to a network 36, includes a classifier 38, receive rings (e.g., first-in, first-out queues) 40 that are each associated with a set of buffers, and send rings 42 used to transmit outgoing network traffic. Incoming network traffic is analyzed by the classifier 38 and assigned to one of the receive rings 40 based on, for example, an identification (e.g., an internet protocol (IP) address) or connection type (e.g., transmission control protocol (TCP)) of a particular packet. The classifier 38 is part of a larger hardware classification "engine" that is statically programmed to direct received traffic to particular receive rings 40 based on information present in the received traffic. Such programming of the network interface card 32 is done statically and is optimized for a default distribution of received traffic to the receive rings 40.

Upon assignment by the classifier 38 of a particular packet to one of the receive rings 40, the packet is forwarded to that receive ring and a corresponding interrupt may be issued to the computing resource 34 to indicate the receipt of new data. Depending on, for example, a priority attributed to a particular receive ring, the computing resource 34 may instantiate a thread or use a current thread to retrieve the new data forwarded to that particular receive ring. In other cases, the computing resource 34 may not actively retrieve new data forwarded to a particular receive ring, and instead, may simply wait for new data to be processed through that particular receive ring.

SUMMARY OF INVENTION

According to one aspect of one or more embodiments of the present invention, a system comprises: a network interface operatively connected to a network and arranged to operatively propagate data packets from the network to at least one of a plurality of receive rings based on configuration information; a plurality of virtual serialization queues arranged to receive data packets from the plurality of receive rings; and management software to (i) monitor an activity of at least one of the plurality of virtual serialization queues, and (ii) dynamically modify the configuration information based on the monitoring.

According to one aspect of one or more embodiments of the present invention, a method of processing network traffic in a host system comprises: receiving data packets from a network; classifying and routing the data packets in a network interface based on configuration information; propagating the data packets from the network interface to the host system; monitoring an activity of the host system; and dynamically modifying the configuration information at least partly based on the monitoring.

According to one aspect of one or more embodiments of the present invention, a system comprises: a network interface card connectable to a network, the network interface card configured to propagate data packets from the network to a host system based on configuration information, where the network interface card includes (i) a classifier configured to receive the data packets from the network, and (ii) a plurality of receive rings to which the classifier is configured to direct the data packets based on the configuration information; a plurality of structures residing in the host system and configured to receive the data packets from the plurality of receive rings; and instructions residing in the host system to dynamically modify the configuration information at least partly based on an activity of at least one of the plurality of structures.

Other aspects and advantages of the invention will be apparent from the following description and the appended claims.

DETAILED DESCRIPTION

Exemplary embodiments of the present invention will be described with reference to the accompanying drawings. Like items in the drawings are shown with the same reference numbers. In the following description of the various embodiments of the present invention, numerous specific details are set forth in order to provide a more thorough understanding of the present invention. However, it will be apparent to one of ordinary skill in the art that the present invention may be practiced without these specific details. In other instances, well-known features have not been described in detail to avoid obscuring the description of the present invention.

Embodiments of the present invention relate to a technique for processing network traffic in a computing environment in which multiple computing resources share a network interface.

Figure 3:
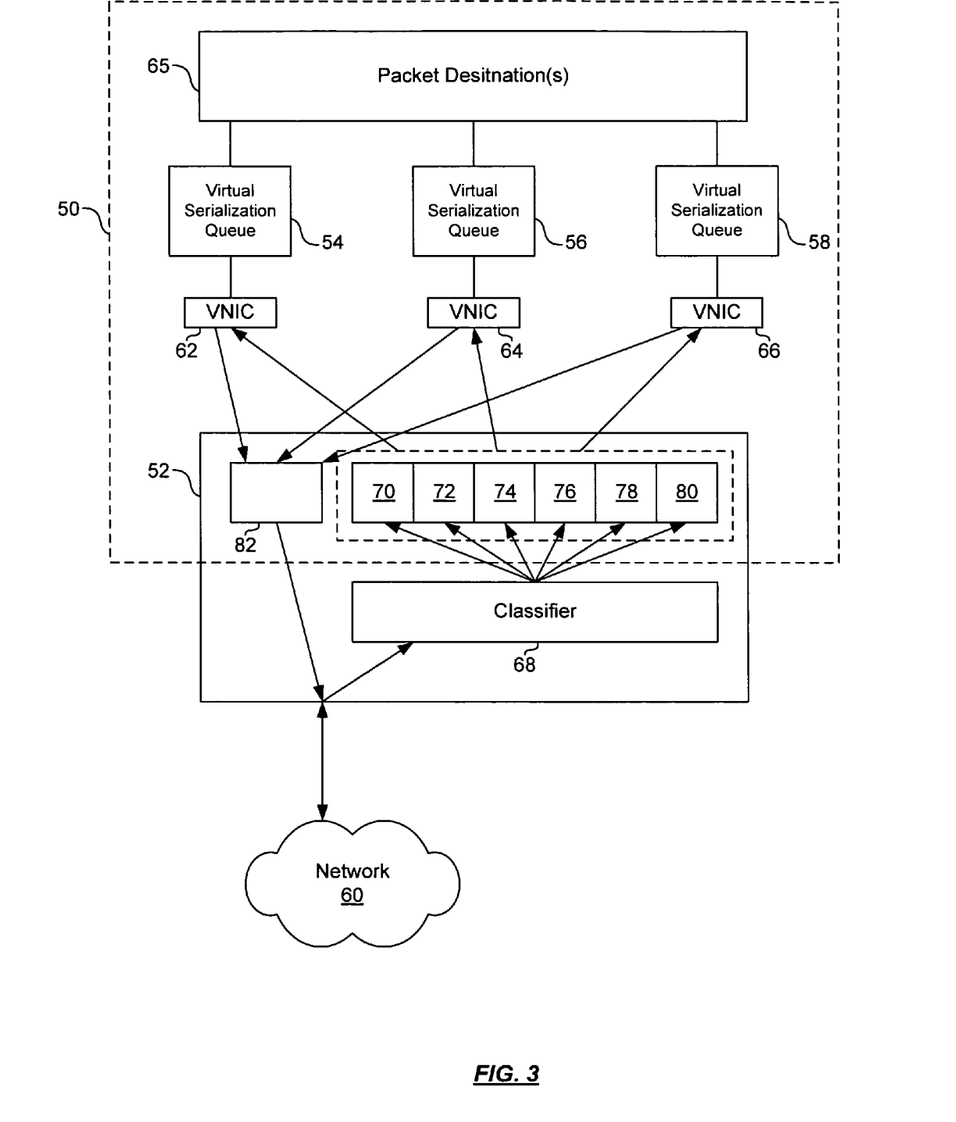
FIG. 3 shows a portion of a networked computing environment in accordance with an embodiment of the present invention.

FIG. 3 shows a portion of an exemplary computing environment in accordance with an embodiment of the present invention. In FIG. 3, a host system 50 is in operative connection with a network interface card 52. The host system 52 includes a plurality of virtual network interface cards 62, 64, 66 (each labeled in FIG. 3 as "VNIC") that are interfaced to a network (e.g., a local area network (LAN), a wide area network (WAN), a wireless network) 60 by the network interface card 52.

In one or more embodiments of the present invention, each virtual network interface card 62, 64, 66 is associated with at least one virtual serialization queue 54, 56, 58. Each serialization queue 54, 56, 58 corresponds to a data structure having at least two queues: an inbound queue and an outbound queue. Each of the queues within the virtual serialization queues 54, 56, 58 may be implemented as first-in, first-out (FIFO) queues. Further, each virtual serialization queue 54, 56, 58 may be configured to send and receive packets from associated virtual network interface cards 62, 64, 66. In addition, each virtual serialization queue 54, 56, 58 is configured to send and receive packets from one or more associated packet destinations (e.g., services and/or containers of the host system 50) 65. Further, each virtual serialization queue 54, 56, 58 may be bound to a computing resource (e.g., a central processing unit (CPU)) (not shown) of the host system 50. Those skilled in the art will appreciate that any number of virtual serialization queues may be bound to a CPU. Further, those skilled in the art will appreciate that any number of virtual serialization queues may be bound to a virtual network interface card.

As described above, each of the plurality of virtual serialization queues 54, 56, 58 is respectively associated with a "virtual" network interface card 62, 64, 66 (each labeled in FIG. 3 as "VNIC"). The virtual network interface cards 62, 64, 66 provide an abstraction layer between the physical network interface card 52 and the various packet destinations (e.g., services and/or containers of the host system 50) 65 present in the host system 50. In other words, each virtual network interface card 62, 64, 66 operates like a physical network interface card. For example, in one embodiment of the present invention, each virtual network interface card 62, 64, 66 may be associated with one or more Internet Protocol (IP) addresses, one or more ports, and/or configured to handle one or more protocol types. Thus, while the host system 50 may be operatively connected to a single physical network interface card 52, packet destinations 65 in the host system 50 operate as if each packet destination has its own physical network interface card.

The network interface card 52, which is connected to the network 60, includes a classifier (e.g., a hardware classifier) 68, receive rings (e.g., first-in, first-out queues) 70, 72, 74, 76, 78, 80 that are each associated with a set of buffers, and send rings 82 used to transmit outgoing network traffic. Incoming network traffic is analyzed by the classifier 68 and assigned to one of the receive rings 70, 72, 74, 76, 78, 80 based on, for example, an identification (e.g., a destination/source internet protocol (IP) address) or connection type (e.g., transmission control protocol (TCP)) of a particular packet.

Those skilled in the art will note that in one or more embodiments of the present invention, a network interface may be implemented without a physical network interface card. For example, in one or more embodiments of the present invention, a network interface may be implemented in software.

As described above with reference to FIG. 3, in an embodiment of the present invention, a host system 50 is shared by multiple services and/or containers. In order to direct the flow of incoming traffic, policies are defined and implemented to control how resources of the network interface card 52 are utilized. In one or more embodiments of the present invention, and as exemplarily described below with reference to FIG. 4, these policies, in conjunction with rules of the host system 50 and current resource utilization information, may be used to dynamically program the overall hardware classification "engine" (which includes the classifier 68) used to route incoming traffic to particular receive rings 70, 72, 74, 76, 78, 80. In one or more embodiments of the present invention, the policies may determine the resource utilization allowed for one or more services of the host system 50. In one or more other embodiments of the present invention, the policies may determine the resource utilization for one or more containers of the host system 50. Further, in one or more other embodiments of the present invention, the policies may determine the resource utilization for any combination of one or more services and one or more containers of the host system 50.

Figure 4:
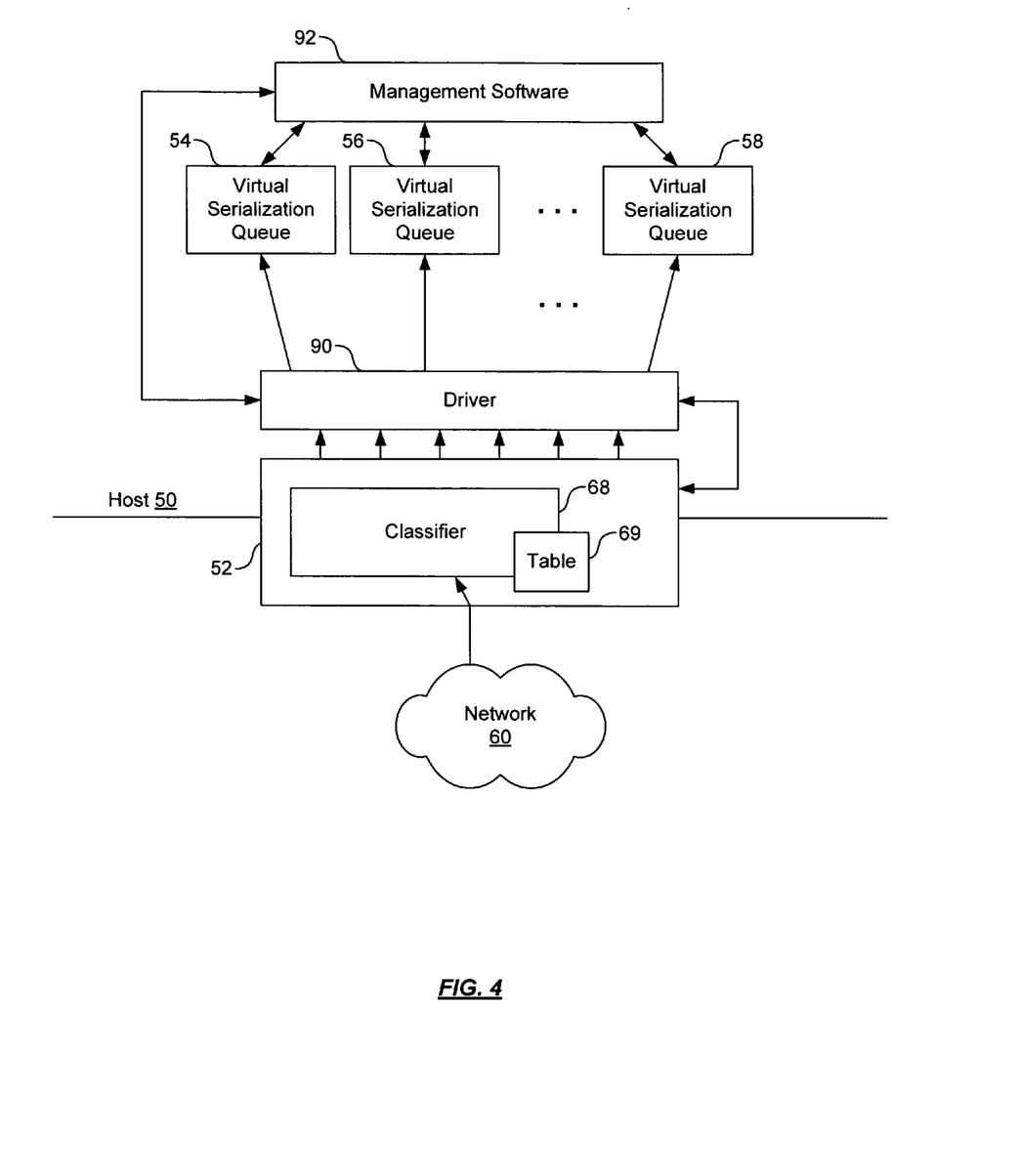
FIG. 4 shows a portion of a networked computing environment in accordance with an embodiment of the present invention.

FIG. 4, in accordance with an embodiment of the present invention, shows an exemplary portion of the portion of the networked computing environment shown in FIG. 3. Incoming traffic from network 60 is routed to the classifier 68, which routes particular packets to particular receive rings (e.g., receive rings 70, 72, 74, 76, 78, 80 shown in FIG. 3) based on information stored in a table 69 associated with the classifier 68. In one or more embodiments of the present invention, the table 69 stores information indicating correspondence between a particular packet and the receive ring to which that particular packet should be directed. For example, the table 69 may include information that associates packets received from a particular IP address to a particular receive ring.

Incoming packets, once classified by the classifier 68 and as stored in the appropriate receive rings, are propagated to an appropriate virtual serialization queue 54, 56, 58 via a driver 90 (and a virtual network interface card 62, 64, 66 as shown in FIG. 3) residing in the host system 50. For example, a packet received by a particular type of transmission protocol is (i) classified as such by the classifier 68, (ii) stored in a receive ring indicated by the table 69 for that type of transmission protocol, and (iii) propagated to or retrieved by the one of the virtual serialization queues 54, 56, 58 associated with that particular type of transmission control.

Interfaced with one or more of the virtual serialization queues 54, 56, 58 is management software 92 that, among other things, monitors the activity of the one or more of the virtual serialization queues 54, 56, 58. Based on rules (e.g., bandwidth constraint information) and policies (e.g., which virtual serialization queues 54, 56, 58 belong to which service or container of the host system 50) defined in the host system 50, the management software 92 is used to determine whether a current resource utilization of the host system 50 is at a desired or optimal level of performance with respect to at least the processing performance of incoming network traffic. By monitoring the activity/performance/behavior of the one or more of the virtual serialization queues 54, 56, 58, the management software 92 may be used to dynamically modify either or both of the driver 90 and the table 69 to effectuate changes in the routing of incoming network traffic to particular points in the host system 50. For example, based on some set of criteria detected by the management software 92, the management software 92, via the driver 90, may dynamically modify the table 69 so as to cause a particular type of packet to be routed to one or more particular receive rings to which that type of packet was not particular routed to prior to the dynamic modification.

Those skilled in the art will note that by dynamically programming the hardware classification "engine" as described above with reference to FIG. 4, desired/optimal resource utilization and/or desired/optimal network performance may be achieved by, for example, avoiding bandwidth bottlenecks created by a particular hardware classification "engine" configuration.

Figure 5:
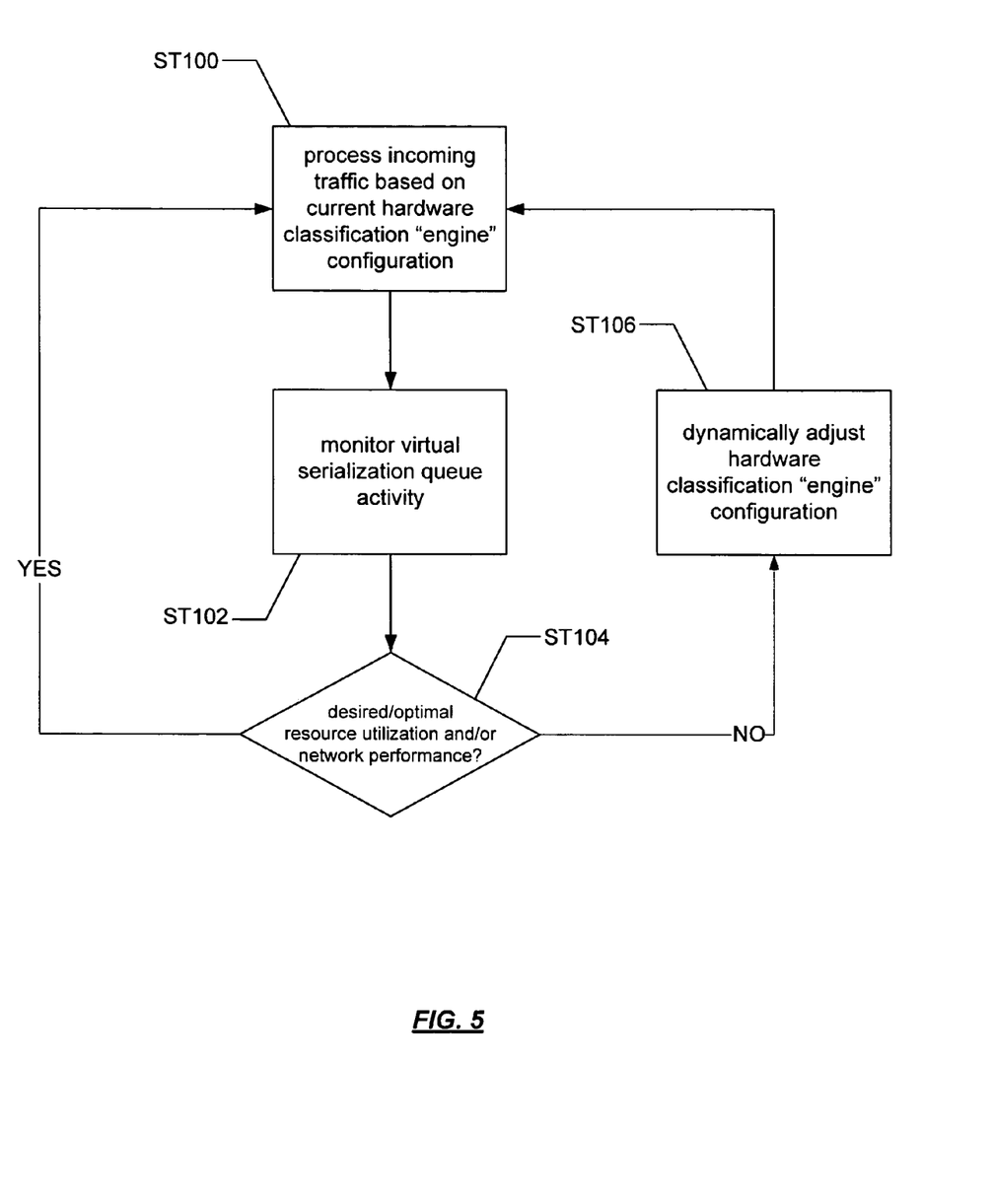
FIG. 5 shows a flow process in accordance with an embodiment of the present invention.

FIG. 5 shows an exemplary flow process in accordance with an embodiment of the present invention. As shown in FIG. 5, incoming network traffic is processed according to a current hardware classification "engine" configuration ST100. Specifically, for example, incoming packets are directed by a classifier (e.g., classifier 68 shown in FIG. 4) to particular receive rings (e.g., receive rings 70, 72, 74, 76, 78, 80 shown in FIG. 3) based on information stored in a table (e.g., table 69 shown in FIG. 4).

As incoming network traffic is processed and propagated to and/or retrieved by components (e.g., virtual serialization queues 54, 56, 58 shown in FIG. 4) of a host system (e.g., host system 50 shown in FIG. 4), software (e.g., management software 92 shown in FIG. 4) monitors the packet activity of these components ST102. If it is determined, based on the monitoring in ST102, that a desired/optimum resource utilization of the host system and/or network performance is being achieved ST104, then the host system continues to process incoming network traffic according to the current hardware classification "engine" configuration ST100. However, if it is determined, based on the monitoring in ST102, that a desired/optimum resource utilization of the host system and/or network performance is not being achieved ST104, the hardware classification "engine" configuration is dynamically modified ST106, whereby the dynamically updated hardware classification "engine" configuration becomes the current hardware classification "engine" configuration and incoming network traffic is processed accordingly ST100.

Figure 6:
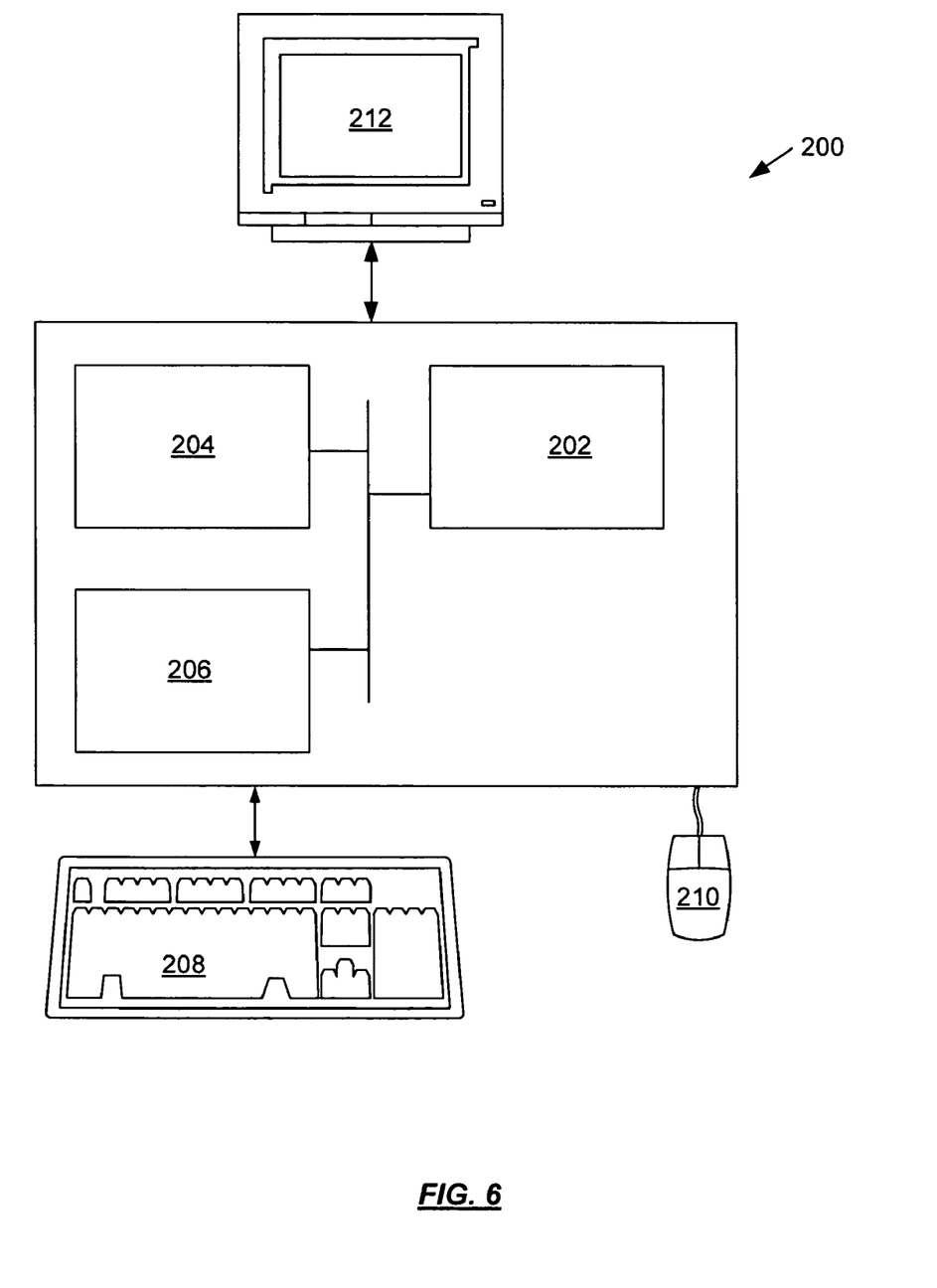
FIG. 6 shows a computer system in accordance with an embodiment of the present invention.

An embodiment of the present invention may be associated with virtually any type of computer system regardless of the platform being used. For example, as shown in FIG. 6, a networked computer system 200 includes a processor 202, associated memory 204, a storage device 206, and numerous other elements (not shown) and functionalities typical of modern computer systems. The networked computer system 200 may also include input means, such as a keyboard 208 and a mouse 210, and output means, such as a monitor 212. The networked computer system 200 is connected to a local area network (LAN) or a wide area network via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform embodiments of the invention may be stored on a computer readable medium such as a compact disc (CD), a diskette, a tape, a file, or any other computer-readable storage device.

Advantages of the present invention may include one or more of the following. In one or more embodiments of the present invention, packet classification performed by a network interface may be programmed dynamically.

In one or more embodiments of the present invention, dynamic programming or "self-tuning" of a hardware classification "engine" may allow for the achievement of desired or optimal resource utilization.

In one or more embodiments of the present invention, dynamic programming or "self-tuning" of a hardware classification "engine" may allow for the achievement of desired or optimal network performance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system to dynamically manage resource utilization of a host system comprising:

a physical network interface card operatively connected to a network and configured to receive data packets from the network and store the received data packets in to at least one of a plurality of receive rings in the physical network interface card based on configuration information, wherein the physical network interface card comprises a classifier configured to use the configuration information to determine to which of the plurality of receive rings to store each of the data packets, wherein the configuration information comprises a plurality of entries each specifying one of the plurality of receive rings;

the host system, operatively connected to the physical network interface card, comprising a plurality of virtual serialization queues and a plurality of virtual network interface cards operatively connected to the plurality of virtual serialization queues, wherein each of the plurality of virtual network interface cards is associated with a distinct internet protocol (IP) address, wherein each of the plurality of virtual network interface cards is associated with at least one of the plurality of receive rings, and wherein each of the plurality of virtual network interface cards is arranged to receive data packets from the plurality of receive rings;

wherein the plurality of virtual serialization queues is arranged to receive data packets from the corresponding plurality of virtual network interface cards; and management software executing on the host and configured to:

monitor an activity of at least one of the plurality of virtual serialization queues to determine resource utilization of the at least one of the plurality of virtual serialization queues, and dynamically modify the configuration information at least based on the monitoring and a resource utilization rule, wherein dynamically modifying the configuration comprises modifying at least one of the plurality of entries in the configuration.

2. The system of claim 1, the classifier comprising a table for storing at least a portion of the configuration information.

3. The system of claim 1, wherein at least one of the plurality of virtual serialization queues is associated with at least one of a service and a container of the system.

4. The system of claim 1, further comprising:

a driver operatively connected to the physical network interface card and at least one of the plurality of virtual serialization queues.

5. The system of claim 4, wherein the driver stores at least a portion of the configuration information.

6. A method of processing network traffic in a host system, the method comprising:

receiving data packets from a network;

classifying and routing the data packets in a network interface card to a plurality of receive rings, wherein the classification is performed by a classifier in the network interface card using a first routing configuration, wherein the first routing configuration comprises a first plurality of entries each specifying one of the plurality of receive rings;

propagating the data packets from the plurality of receive rings to a plurality of virtual network interface cards, wherein each of the plurality of virtual network interface cards is associated with a distinct internet protocol (IP) address;

propagating the data packets from the plurality of virtual network interface cards to at least one of a plurality of virtual serialization queues;

monitoring in the host system, a number of data packets propagated to each of the plurality of virtual serialization queues to determine resource utilization of the plurality of virtual serialization queues; and dynamically modifying at least one of the first plurality of entries in the first routing configuration to obtain a second routing configuration at least based on the monitoring and a resource utilization rule, wherein the second routing configuration comprises a second plurality of entries each specifying one of the plurality of receive rings, wherein the first routing configuration is different than the second routing configuration.

7. The method of claim 6, further comprising:

dynamically modifying the configuration information at least based on a current resource utilization of the host system.

* * * * *

UNITED STATES PATENT AND TRADEMARK OFFICE
CERTIFICATE OF CORRECTION

PATENT NO. : 7,593,404 B1 Page 1 of 1
APPLICATION NO. : 11/112934
DATED : September 22, 2009
INVENTOR(S) : Nicolas G. Droux et al.

It is certified that error appears in the above-identified patent and that said Letters Patent is hereby corrected as shown below:

In Claim 1, Column 6 (line 67), please delete "to at";

In Claim 1, Column 7 (line 1), please delete "least".

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO.       : 7,593,404 B1                                       Page 1 of 1
APPLICATION NO. : 11/112934
DATED            : September 22, 2009
INVENTOR(S)      : Droux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Twenty-first Day of September, 2010

David J. Kappos
*Director of the United States Patent and Trademark Office*